(12) United States Patent
Zeng et al.

(10) Patent No.: US 11,573,579 B1
(45) Date of Patent: Feb. 7, 2023

(54) METHOD, SYSTEM, AND DEVICE FOR PLANNING PATH FOR FORCED LANDING OF AIRCRAFT BASED ON IMAGE RECOGNITION

(71) Applicant: Zhuhai Xiangyi Aviation Technology Company LTD., Zhuhai (CN)

(72) Inventors: Tian Zeng, Zhuhai (CN); Lin Wu, Zhuhai (CN); Xiaodong Liu, Zhuhai (CN); Zonghua Ye, Zhuhai (CN); Huilin Dai, Zhuhai (CN); Peiyan Weng, Zhuhai (CN)

(73) Assignee: Zhuhai Xiangyi Aviation Technology Company LTD., Zhuhai (CN)

( * ) Notice: Subject to any disclaimer, the term of this patent is extended or adjusted under 35 U.S.C. 154(b) by 0 days.

(21) Appl. No.: 17/844,007

(22) Filed: Jun. 19, 2022

(30) Foreign Application Priority Data

May 23, 2022 (CN) .......................... 202210559442.4

(51) Int. Cl.
| | | |
|---|---|---|
| *G05D 1/10* | (2006.01) | |
| *G05D 1/06* | (2006.01) | |
| *G06V 20/13* | (2022.01) | |
| *G06V 10/46* | (2022.01) | |
| *G06V 10/762* | (2022.01) | |

(Continued)

(52) U.S. Cl.
CPC .......... *G05D 1/105* (2013.01); *B64C 39/024* (2013.01); *G05D 1/0676* (2013.01); *G05D 1/0688* (2019.05); *G06V 10/467* (2022.01); *G06V 10/751* (2022.01); *G06V 10/762* (2022.01); *G06V 10/82* (2022.01); *G06V 20/13* (2022.01); *B64C 2201/141* (2013.01); *B64C 2201/18* (2013.01)

(58) Field of Classification Search
CPC .... G05D 1/105; G05D 1/0676; G05D 1/0688; B64C 39/024; B64C 2201/141; B64C 2201/18; G06V 10/467; G06V 10/751; G06V 10/762; G06V 10/82; G06V 20/13
See application file for complete search history.

(56) References Cited

U.S. PATENT DOCUMENTS

| | | | | |
|---|---|---|---|---|
| 6,038,498 A | * | 3/2000 | Briffe | .................... G01C 23/00 701/14 |
| 6,112,141 A | * | 8/2000 | Briffe | .................... G01C 23/00 345/1.3 |

(Continued)

*Primary Examiner* — Bhavesh V Amin
(74) *Attorney, Agent, or Firm* — Bayramoglu Law Offices LLC (57) ABSTRACT

A method, system, and device for planning a path for a forced landing of an aircraft based on image recognition are provided. The method includes: calculating an endurance distance of an aircraft based on sensor data and meteorological information; obtaining an alternative landing area by a satellite image containing contour information and a terrain image recognition model; obtaining a current satellite image of the alternative landing area and determining a landing area; and selecting a landing site by a landing site decision model and generating a path for a forced landing, such that the aircraft completes a forced landing task according to the path for the forced landing. The method, system, and device can automatically recognize image information, select a best landing site, and generate a path for a forced landing to assist a pilot in performing a forced landing task.

18 Claims, 2 Drawing Sheets

(51) Int. Cl.
*G06V 10/82* (2022.01)
*B64C 39/02* (2006.01)
*G06V 10/75* (2022.01)

(56) References Cited

U.S. PATENT DOCUMENTS

| | | | | |
|---|---|---|---|---|
| 6,181,987 B1* | 1/2001 | Deker | | G01C 23/00 701/14 |
| 6,199,008 B1* | 3/2001 | Aratow | | G06T 11/206 701/14 |
| 6,707,394 B2* | 3/2004 | Ishihara | | G01C 5/005 701/9 |
| 7,492,307 B2* | 2/2009 | Coulmeau | | G08G 5/0021 342/29 |
| 7,839,322 B2* | 11/2010 | Filias | | G05D 1/0646 340/963 |
| 7,925,394 B2* | 4/2011 | Deker | | G05D 1/0676 244/175 |
| 8,032,267 B1* | 10/2011 | Simon | | G01C 23/005 701/4 |
| 8,193,948 B1* | 6/2012 | Shapiro | | G01C 23/005 701/16 |
| 8,234,068 B1* | 7/2012 | Young | | G08G 5/0034 701/410 |
| 8,275,499 B2* | 9/2012 | Coulmeau | | G08G 5/006 244/175 |
| 8,332,083 B1* | 12/2012 | McCusker | | G05D 1/0676 701/4 |
| 8,467,917 B2* | 6/2013 | Botargues | | G05D 1/1062 340/976 |
| 8,565,944 B1* | 10/2013 | Gershzohn | | G08G 5/0039 701/25 |
| 8,666,649 B2* | 3/2014 | Otto | | G08G 5/0056 701/120 |
| 8,718,915 B1* | 5/2014 | Turcios | | G08G 5/0021 701/3 |
| 8,897,932 B2* | 11/2014 | Komatsuzaki | | G08G 5/006 244/175 |
| 9,064,407 B2* | 6/2015 | Otto | | G08G 5/025 |
| 9,199,724 B2* | 12/2015 | Pastor | | G05D 1/0688 |
| 9,257,048 B1* | 2/2016 | Offer | | G08G 5/0056 |
| 9,310,222 B1* | 4/2016 | Suiter | | G08G 5/0091 |
| 9,423,799 B1* | 8/2016 | Wu | | G08G 5/0026 |
| 9,483,952 B2* | 11/2016 | Chew | | G06T 7/0008 |
| 9,858,823 B1* | 1/2018 | Lynn | | G07C 5/085 |
| 10,096,253 B2* | 10/2018 | Moravek | | B64D 43/00 |
| 10,114,381 B2* | 10/2018 | Haskins | | G05D 1/0676 |
| 10,203,700 B2* | 2/2019 | Haskins | | G08G 5/02 |
| 10,290,217 B1* | 5/2019 | Ramachandra | | G01C 21/00 |
| 10,339,816 B2* | 7/2019 | Sharma | | G08G 5/0026 |
| 10,339,817 B1* | 7/2019 | McGaughy | | G08G 5/0021 |
| 10,620,641 B2* | 4/2020 | Haskins | | G08G 5/0086 |
| 10,816,970 B2* | 10/2020 | Bosworth | | B64C 13/18 |
| 11,023,788 B2* | 6/2021 | Huberman | | G06V 20/56 |
| 11,176,838 B2* | 11/2021 | Chartier | | G08G 5/0008 |
| 11,189,181 B2* | 11/2021 | Haskins | | G08G 5/02 |
| 11,282,399 B2* | 3/2022 | Haskins | | G08G 5/0086 |
| 2002/0116097 A1* | 8/2002 | Block | | G01C 23/00 701/8 |
| 2003/0093187 A1* | 5/2003 | Walker | | B64D 45/0059 701/1 |
| 2004/0093131 A1* | 5/2004 | Block | | G01S 13/913 340/963 |
| 2005/0014499 A1* | 1/2005 | Knoblach | | G01S 19/42 455/13.1 |
| 2007/0088492 A1* | 4/2007 | Bitar | | G08G 5/006 701/4 |
| 2007/0129855 A1* | 6/2007 | Coulmeau | | G08G 5/0056 701/3 |
| 2007/0150170 A1* | 6/2007 | Deker | | G05D 1/0646 701/120 |
| 2007/0174005 A1* | 7/2007 | Bitar | | G09B 29/12 701/3 |
| 2007/0215745 A1* | 9/2007 | Fleury | | G01C 23/005 244/2 |
| 2007/0219678 A1* | 9/2007 | Coulmeau | | G01C 23/005 701/3 |
| 2007/0219679 A1* | 9/2007 | Coulmeau | | G08G 5/0013 701/3 |
| 2007/0219705 A1* | 9/2007 | Bitar | | G01C 21/005 701/4 |
| 2007/0225876 A1* | 9/2007 | Caillaud | | G08G 5/0039 701/16 |
| 2007/0285283 A1* | 12/2007 | Bitar | | G08G 5/0086 340/963 |
| 2008/0086243 A1* | 4/2008 | Caillaud | | G05D 1/101 701/411 |
| 2008/0177432 A1* | 7/2008 | Deker | | G05D 1/0676 701/17 |
| 2008/0195309 A1* | 8/2008 | Prinzel, III | | G01C 23/00 701/532 |
| 2008/0221745 A1* | 9/2008 | Diamandis | | B64G 3/00 701/3 |
| 2008/0306680 A1* | 12/2008 | Marty | | G01C 21/00 701/533 |
| 2009/0171560 A1* | 7/2009 | McFerran | | G08G 5/025 701/533 |
| 2010/0070110 A1* | 3/2010 | Badli | | G08G 5/0021 701/31.4 |
| 2010/0238161 A1* | 9/2010 | Varga | | G06T 19/006 345/157 |
| 2010/0240988 A1* | 9/2010 | Varga | | G06F 3/011 600/425 |
| 2011/0196598 A1* | 8/2011 | Feyereisen | | G08G 5/0043 701/120 |
| 2011/0264312 A1* | 10/2011 | Spinelli | | G08G 5/0056 701/16 |
| 2012/0319869 A1* | 12/2012 | Dorfmann | | G01C 23/00 340/945 |
| 2013/0179011 A1* | 7/2013 | Colby | | G05D 1/106 701/16 |
| 2013/0179059 A1* | 7/2013 | Otto | | G08G 5/0095 701/120 |
| 2013/0204470 A1* | 8/2013 | Luckner | | G05D 1/0676 701/18 |
| 2014/0343765 A1* | 11/2014 | Suiter | | B64D 45/08 701/18 |
| 2015/0066370 A1* | 3/2015 | Sakurai | | G01W 1/10 702/3 |
| 2015/0071528 A1* | 3/2015 | Marchisio | | G06F 16/29 382/159 |
| 2015/0153740 A1* | 6/2015 | Ben-Shachar | | G05D 1/0676 701/16 |
| 2015/0279218 A1* | 10/2015 | Irrgang | | G07C 5/0816 701/3 |
| 2015/0371544 A1* | 12/2015 | Mere | | G08G 5/0039 701/3 |
| 2016/0019793 A1* | 1/2016 | Fournier | | G08G 5/0034 701/400 |
| 2016/0085239 A1* | 3/2016 | Boyer | | G01C 21/00 701/5 |
| 2016/0116917 A1* | 4/2016 | Bataillon | | G05D 1/0676 701/16 |
| 2016/0229554 A1* | 8/2016 | Kawalkar | | G08G 5/0056 |
| 2016/0364989 A1* | 12/2016 | Speasl | | G08G 5/0069 |
| 2017/0084183 A1* | 3/2017 | Knox | | G01S 13/933 |
| 2017/0090478 A1* | 3/2017 | Blayvas | | G06Q 10/04 |
| 2017/0154537 A1* | 6/2017 | Moravek | | B64D 43/00 |
| 2017/0168658 A1* | 6/2017 | Lacko | | G01C 23/005 |
| 2017/0229024 A1* | 8/2017 | Moravek | | G01C 21/20 |
| 2017/0248969 A1* | 8/2017 | Ham | | G08G 5/0021 |
| 2017/0249852 A1* | 8/2017 | Haskins | | G08G 5/0086 |
| 2017/0320589 A1* | 11/2017 | Moravek | | G08G 5/0013 |
| 2018/0061243 A1* | 3/2018 | Shloosh | | G08G 5/0043 |
| 2018/0061246 A1* | 3/2018 | Adler | | G08G 5/045 |
| 2018/0068569 A1* | 3/2018 | Chmelarova | | G01C 21/20 |
| 2018/0144643 A1* | 5/2018 | Moravek | | G08G 5/0021 |
| 2018/0148192 A1* | 5/2018 | Haskins | | B64D 25/00 |
| 2018/0259641 A1* | 9/2018 | Vacanti | | G01S 13/953 |

(56) References Cited

U.S. PATENT DOCUMENTS

| | | | |
|---|---|---|---|
| 2018/0281988 A1* | 10/2018 | Tellechea | G08G 5/025 |
| 2018/0327091 A1* | 11/2018 | Burks | B64F 1/007 |
| 2018/0364707 A1* | 12/2018 | Bosworth | G05D 1/0676 |
| 2019/0002122 A1* | 1/2019 | Ding | B64D 45/04 |
| 2019/0041233 A1* | 2/2019 | Duerksen | G08G 5/0034 |
| 2019/0094886 A1* | 3/2019 | Haskins | B64D 45/04 |
| 2019/0129448 A1* | 5/2019 | Haskins | B64D 45/04 |
| 2020/0026309 A1* | 1/2020 | Ma | B64D 47/08 |
| 2020/0387172 A1* | 12/2020 | Haskins | G01S 19/15 |
| 2021/0264798 A1* | 8/2021 | B | G08G 5/0039 |
| 2022/0058970 A1* | 2/2022 | Haskins | B64D 45/04 |
| 2022/0172630 A1* | 6/2022 | Haskins | G08G 5/025 |

* cited by examiner

METHOD, SYSTEM, AND DEVICE FOR PLANNING PATH FOR FORCED LANDING OF AIRCRAFT BASED ON IMAGE RECOGNITION

CROSS REFERENCE TO THE RELATED APPLICATIONS

This application is based upon and claims priority to Chinese Patent Application No. 202210559442.4, filed on May 23, 2022, the entire contents of which are incorporated herein by reference.

TECHNICAL FIELD

The present disclosure relates to the field of image recognition, and specifically, to a method, system, and device for planning a path for a forced landing of an aircraft based on image recognition.

BACKGROUND

With the development of technologies, aircrafts have become one of the main traffic and transportation means. An aircraft can be in service for more than ten years. With the increased service time of the aircraft, various failures will inevitably occur on the aircraft. In case of severe weather conditions, the aircraft may also be damaged to some extent, making the aircraft unable to reach a destination safely.

When the aircraft cannot reach the destination safely, a pilot must make a forced landing based on the current condition of the aircraft. At present, in case of aircraft malfunction, the pilot can perform a forced landing task only by receiving a remote instruction from a tower. All operations performed by the pilot are responses made based on visual recognition. However, in the face of poor visibility or cloud occlusion, it is difficult to make a correct response only based on visual recognition without auxiliary equipment. The forced landing task is usually done as a last resort and characterized by very short response time and a high real-time requirement. It is important that assistance to the pilot is provided as much as possible to improve the success probability of forced landing.

SUMMARY

To resolve the above problem in the prior art, namely, the problem that it is difficult to make a correct response without auxiliary equipment in the face of insufficient visibility or cloud occlusion, the present disclosure provides a method for planning a path for a forced landing of an aircraft based on image recognition. The method includes:

obtaining a historical satellite image, meteorological information, and a contour image in a flight course;

obtaining, based on the contour image and a satellite image in the flight course, a satellite image containing contour information;

obtaining sensor data based on a sensor disposed on an aircraft;

calculating an endurance distance of the aircraft based on the sensor data and the meteorological information;

obtaining an alternative landing area by the satellite image containing the contour information and a terrain image recognition model based on coordinates and the endurance distance of the aircraft;

obtaining a current satellite image of the alternative landing area and determining a landing area; and selecting a landing site by a landing site decision model based on the landing area and generating a path for a forced landing, such that the aircraft completes a forced landing task according to the path for the forced landing.

In some preferred implementations, a method for obtaining the alternative landing area includes:

selecting continuous areas with a height difference less than a preset smoothness threshold as a flat area based on the satellite image containing the contour information;

recognizing a terrain analysis result of each flat area by the terrain image recognition model;

calculating a length and a width of a corresponding touchdown taxiing rectangular box based on the terrain analysis result; and selecting a flat area sufficient to contain the touchdown taxiing rectangular box as the alternative landing area and calculating a landing score for the alternative landing area based on the terrain analysis result.

In some preferred implementations, the terrain image recognition model includes a terrain type recognition model, a terrain uniformity recognition model, and a block consistency recognition model.

The terrain type recognition model is used to recognize a terrain type of the flat area based on the historical satellite image.

The terrain uniformity recognition model is used to recognize an image uniformity score of the flat area based on the historical satellite image.

The block consistency recognition model is used to divide the historical satellite image into different grids and calculate a consistency score between each grid and all other grids.

The terrain analysis result is obtained through weighted summation based on the terrain type, the image uniformity score, and the consistency score.

Another aspect of the present disclosure provides a system for planning a path for a forced landing of an aircraft based on image recognition, which includes a navigation information obtaining module, an image information combination module, a sensor data obtaining module, an endurance distance obtaining module, an alternative-landing area obtaining module, a landing area selection module, and a path generation module.

The navigation information obtaining module is configured to obtain a historical satellite image, meteorological information, and a contour image in a flight course.

The image information combination module is configured to obtain, based on the contour image and a satellite image in the flight course, a satellite image containing contour information.

The sensor data obtaining module is configured to obtain sensor data based on a sensor disposed on an aircraft.

The endurance distance obtaining module is configured to calculate an endurance distance of the aircraft based on the sensor data and the meteorological information.

The alternative-landing area obtaining module is configured to obtain an alternative landing area by the satellite image containing the contour information and a terrain image recognition model based on coordinates and the endurance distance of the aircraft.

The landing area selection module is configured to obtain a current satellite image of the alternative landing area and determine a landing area.

The path generation module is configured to select a landing site by a landing site decision model based on the landing area and generate a path for a forced landing, such that the aircraft completes a forced landing task according to the path for the forced landing.

A third aspect of the present disclosure provides an electronic device, including: at least one processor and a memory communicatively connected to the at least one processor. The memory stores an instruction executable by the processor, and the instruction is configured to be executed by the processor to implement the above method for planning a path for a forced landing of an aircraft based on image recognition.

A fourth aspect of the present disclosure provides a computer-readable storage medium. The computer-readable storage medium stores a computer instruction, and the computer instruction is configured to be executed by a computer to implement the above method for planning a path for a forced landing of an aircraft based on image recognition.

The present disclosure has the following beneficial effects:
(1) The present disclosure automatically recognizes image information, selects the optimal landing site and generates a path for a forced landing to assist a pilot in performing a forced landing task. This can greatly improve a success rate of the pilot in performing the forced landing task, increase safety, and reduce a loss.
(2) In the present disclosure, the landing site is selected by comprehensively considering a terrain type, uniformity, and consistency, which reduces a possible loss caused by the forced landing task.

BRIEF DESCRIPTION OF THE DRAWINGS

Other features, objectives, and advantages of the present disclosure will become more apparent upon reading the detailed description of the non-restrictive embodiments made below with reference to the accompanying drawings.

DETAILED DESCRIPTION OF THE EMBODIMENTS

The present disclosure will be further described in detail below with reference to the accompanying drawings and embodiments. It should be understood that the specific embodiments described herein are intended merely to explain the present disclosure, rather than to limit the present disclosure. It should also be noted that, for convenience of description, only the parts related to the present disclosure are shown in the accompanying drawings.

It should be noted that the embodiments in the present disclosure and features in the embodiments may be combined with each other if no conflict occurs. The present disclosure will be described in detail below with reference to the accompanying drawings and embodiments.

The present disclosure provides a method for planning a path for a forced landing of an aircraft based on image recognition, to automatically recognize image information, select a best landing site, and generate a path for a forced landing to assist a pilot in performing a forced landing task. This can greatly improve a success rate of the pilot in performing the forced landing task, increase safety, and reduce a loss.

A method for planning a path for a forced landing of an aircraft based on image recognition according to the present disclosure includes the following steps:

S100: Obtain a historical satellite image, meteorological information, and a contour image in a flight course.

S200: Obtain, based on the contour image and a satellite image in the flight course, a satellite image containing contour information.

S300: Obtain sensor data based on a sensor disposed on an aircraft.

S400: Calculate an endurance distance of the aircraft based on the sensor data and the meteorological information.

S500: Obtain an alternative landing area by the satellite image containing the contour information and a terrain image recognition model based on coordinates and the endurance distance of the aircraft.

S600: Obtain a current satellite image of the alternative landing area and determine a landing area.

S700: Select a landing site by a landing site decision model based on the landing area and generate a path for a forced landing, such that the aircraft completes a forced landing task according to the path for the forced landing.

To more clearly explain a system in the present disclosure, steps in the embodiments of the present disclosure are described in detail below with reference to Figure.

Figure 1:
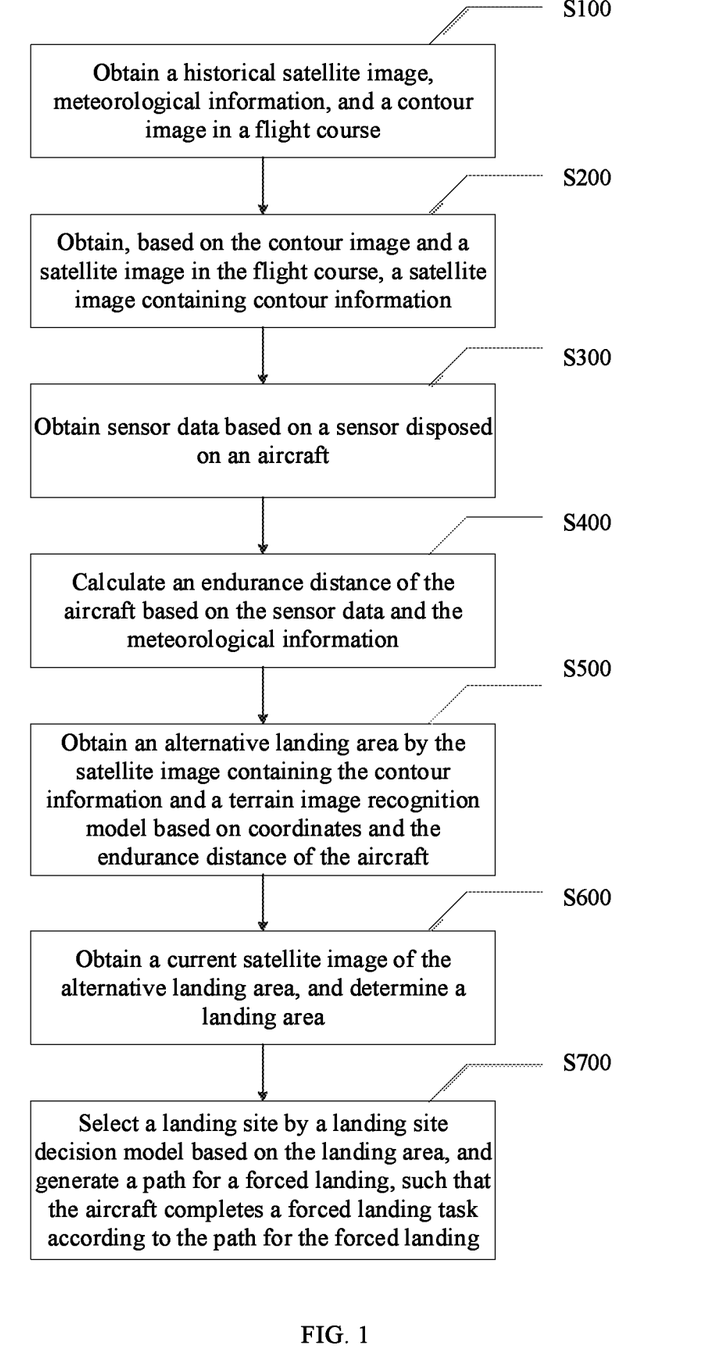
FIG. 1 is a schematic flowchart of a method for planning a path for a forced landing of an aircraft based on image recognition according to an embodiment of the present disclosure.

A method for planning a path for a forced landing of an aircraft based on image recognition according to a first embodiment of the present disclosure includes the following steps:

S100: Obtain a historical satellite image, meteorological information, and a contour image in a flight course.

S200: Obtain, based on the contour image and a satellite image in the flight course, a satellite image containing contour information. The satellite image containing the contour information combines terrain type information and terrain information.

S300: Obtain sensor data based on a sensor disposed on an aircraft.

S400: Calculate an endurance distance of the aircraft based on the sensor data and the meteorological information.

S500: Obtain an alternative landing area by the satellite image containing the contour information and a terrain image recognition model based on coordinates and the endurance distance of the aircraft.

In this embodiment, a method for obtaining the alternative landing area includes:

selecting continuous areas with a height difference less than a preset smoothness threshold as a flat area based on the satellite image containing the contour information; and recognizing a terrain analysis result of each flat area by the terrain image recognition model.

In this embodiment, the terrain image recognition model includes a terrain type recognition model, a terrain uniformity recognition model, and a block consistency recognition model.

When a landing area is selected, there may be many terrain types, concave and convex points or other irregularities in a certain area. Therefore, a terrain type is combined with uniformity and block consistency, such that the uniformity and the block consistency can also be taken as reference factors to select a flat area with a suitable ground type and a balanced sundries distribution on the ground as the landing area.

The terrain type recognition model is used to recognize a terrain type of the flat area based on the historical satellite image. The terrain type may be an airport, a water surface, a grassland, vegetation, a highway, or open space. When there is an airport within the endurance distance, the airport is preferred as the landing area.

In this embodiment, the terrain type recognition model is a classification model constructed based on a local binary pattern (LBP) algorithm and a K-clustering algorithm, and specifically performs the following operations:

converting a historical satellite image of the flat area into a binary image and setting a neighborhood window for each pixel dot;

calculating an average pixel value of pixels in the neighborhood window of each pixel dot;

comparing the average pixel value with a pixel value of a corresponding pixel dot and marking a pixel dot whose pixel value is less than or equal to the average pixel value as 1 and a pixel dot whose pixel value is greater than the average pixel value as 0 to obtain an LBP image;

performing feature extraction on the LBP image by a convolution layer to obtain an LBP feature image;

combining the LBP feature image and the satellite image by a concat layer to obtain a combined feature image; and calculating a similarity between the combined feature image and each terrain image in a preset terrain category database by a K-nearest neighbor algorithm (KNN) classifier based on the combined feature image to output the terrain type of the flat area.

The terrain uniformity recognition model is used to recognize an image uniformity score of the flat area based on the historical satellite image.

In this embodiment, the terrain uniformity recognition model specifically performs the following operations:

calculating uniformity y between each pixel dot and a pixel in the flat area:

$$\gamma = \frac{\sum_{i=1, j=1}^{n}(e_{i,j}-\mu_x)(e_{i,j}-\mu_y)}{\sigma_x \sigma_y}$$

where $e_{i,j}$ represents a pixel value with coordinates being (i,j), i and j represent pixel numbers, $\mu_x$ represents an expected pixel value in an x-axis direction, $\mu_y$ represents an expected pixel value in a y-axis direction, $\sigma_x$ represents a standard deviation between pixels in the x-axis direction, and $\sigma_y$ represents a standard deviation between pixels in the y-axis direction; and an average correlation degree of pixel dots in the flat area represents the image uniformity score of the flat area.

The block consistency recognition model is used to divide the historical satellite image into different grids and calculate a consistency score between each grid and all other grids.

In this embodiment, the block consistency recognition model is specifically as follows:

$$U = \sum_{l} \lambda_c U_c^l + \lambda_d U_d^l$$

where U represents the consistency score, l represents a scale of the grid, $U_c^l$ represents a color consistency score, $U_d^l$ represents a consistency score of a relative height, $\lambda_c$ represents a weight of the color consistency score, and $\lambda_d$ represents a weight of the consistency score of the relative height.

The color consistency score $U_c^l$ is:

$$U_c^l = U_{color, p \to q} + U_{color, q \to p}$$

where $U_{color,p \to q}$ represents a color similarity from grid p to grid q, and $U_{color,q \to p}$ represents a color similarity from grid q to grid p, in other words, $$U_{color,p \to q} = \frac{1}{N} \sum_{s_p s_q} \alpha \frac{1 - SSIM(s_p, s_q)}{2} + (1-\alpha)|s_p - s_q|$$

$$U_{color,q \to p} = \frac{1}{N} \sum_{s_q s_p} \alpha \frac{1 - SSIM(s_q, s_p)}{2} + (1-\alpha)|s_q - s_p|$$

where $SSIM(s_p, s_q)$ and $SSIM(s_q, s_p)$ represent calculation of a similarity from grid p to grid q and calculation of a similarity from grid q to grid p, respectively; $s_p$ and $s_q$ represent average color values of the grids, respectively; $\alpha$ represents a preset constant, and N represents a quantity of grids.

The consistency score $U_d^l$ of the relative height is:

$$U_d^l = U_{depth, p \to q} U_{depth, q \to p}$$

The $U_{depth,p \to q}$ represents consistency of relative heights of images from grid p to grid, and $U_{depth,q \to p}$ represents consistency of relative heights of images from grid q to grid p in other words:

$$U_{depth,p \to q} = \frac{1}{N} \sum |d_p - d_q|$$

$$U_{depth,q \to p} = \frac{1}{N} \sum |d_q - d_p|$$

where $d_p$ represents an average height of grid p, $d_q$ represents an average height of grid q, and a is preferably set to 0.85.

The terrain analysis result is obtained through weighted summation based on the terrain type, the image uniformity score, and the consistency score.

A length and a width of a corresponding touchdown taxiing rectangular box are obtained based on the terrain analysis result.

A flat area sufficient to contain the touchdown taxiing rectangular box is selected as the alternative landing area, and a landing score is calculated for the alternative landing area based on the terrain analysis result. The width of the touchdown taxiing rectangular box is a wingspan width of the aircraft plus a preset failure tolerance width. The length of the touchdown taxiing rectangular box is calculated based on a braking coefficient of a ground type and a flight speed of a normal flight.

S600: Obtain a current satellite image of the alternative landing area and determine the landing area.

In this embodiment, the obtaining a current satellite image of the alternative landing area and determining the landing area specifically includes:

The current satellite image of the alternative landing area may be obtained, and A similarity between a current satellite image of an alternative landing area with a highest landing score and the historical satellite image may be calculated. When the similarity is greater than or equal to a preset reliable threshold, the alternative landing area with the highest landing score as the landing area may be selected. The similarity between the current satellite image and the historical satellite image is calculated to confirm whether there is a temporary activity or a topographic change in the landing area, such as crowd gathering or a landslide. Because a forced landing task is an emergency, there is no time to wait for re-obtaining current satellite images of all regions in the flight course to perform re-analysis. Only the similarity between the current satellite image of the selected alternative landing area with the highest landing score and the historical satellite image is analyzed, which is conducive to quickly determining whether the alternative landing area with the highest landing score is reliable. If there is no crowd gathering or terrain change, the alternative landing area with the highest score is considered as reliable and can be selected as the landing area.

When the similarity is less than a preset reliable threshold, an alternative landing area with a second highest landing score may be selected, a similarity between a current satellite image and the historical satellite image may be calculated, and the landing area may be determined until a similarity is greater than or equal to the preset reliable threshold.

S700: A landing site may be selected by a landing site decision model based on the landing area. A path for a forced landing may be generated, such that the aircraft completes the forced landing task according to the path for the forced landing.

In this embodiment, a method for selecting the landing site may include:

A travel direction from the coordinates of the aircraft to the landing area based on the coordinates of the aircraft may be calculated.

In the landing area, the travel direction may be taken as an axis. If there is space containing the touchdown taxiing rectangular box in a direction of the axis, a midpoint of a start edge that achieves a longest touchdown taxiing rectangular box in the direction of the axis is selected as the landing site.

If there is no space containing the touchdown taxiing rectangular box in a direction of the axis, a midpoint of a start edge that achieves a longest touchdown taxiing rectangular box in a direction with a smallest deflection angle in the direction of the axis may be selected as the landing site.

In this embodiment, the path for the forced landing can be displayed to a pilot by an augmented reality device. All alternative landing areas are displayed to the pilot, such that the pilot can select the landing area and send position information of the landing area to a control tower.

According to a second embodiment of the present disclosure, the method for planning a path for a forced landing of an aircraft based on image recognition according to the present disclosure can be applied to flight training performed for a pilot by a full-motion simulator, which specifically includes:

obtaining a historical satellite image, meteorological information, and a contour image in a flight course;

obtaining an image in a normal flight;

obtaining, based on the contour image and a satellite image in the flight course, a satellite image containing contour information;

recording data from a sensor disposed on an aircraft in the normal flight to obtain sensor data;

performing scenario restoration on the image and the sensor data in the normal flight in the full-motion simulator;

establishing a failure type database to store various failure types and sensor data corresponding to various failure degrees, including an oil quantity, instrument parameters, sound, a vibration amplitude, and a frequency;

selecting a failure type and a failure degree randomly or by a training host, simulating a sudden failure in the normal flight on the full-motion simulator and setting sensor data corresponding to the failure degree to train the pilot to perform a forced landing task; restoring a real cabin view image and displaying the sensor data in a cabin of the full-motion flight simulator; setting thunderstorm, wind shear, turbulence, and special conditions as required and setting different visibility; setting flight periods in the morning, daytime, evening, and night; and simulating special weather, turbulence, vibration, or falling when the failure occurs;

calculating an endurance distance of the aircraft based on the sensor data and the meteorological information;

obtaining an alternative landing area by the satellite image containing the contour information and a terrain image recognition model based on coordinates and the endurance distance of the aircraft;

obtaining a current satellite image of the alternative landing area and determining a landing area; and selecting a landing site by a landing site decision model based on the landing area, and generating a path for a forced landing, such that the aircraft completes the forced landing task according to the path for the forced landing.

In this embodiment, after the forced landing is completed, an actual landing site, an actual touchdown taxiing distance, and an actual touchdown taxiing direction can be recorded. A relative distance between the actual landing site and a landing site recommended by the system can be calculated. A deviation between the actual touchdown taxiing distance and a touchdown taxiing distance recommended by the system, and a deviation between the actual touchdown taxiing direction and a touchdown taxiing direction recommended by the system can be calculated.

A task completion score is calculated based on task completion time, the relative distance, the deviation between the touchdown taxiing distances, and the deviation between the touchdown taxiing angles, and a wrong operation step is searched for.

A system for planning a path for a forced landing of an aircraft based on image recognition according to a third embodiment of the present disclosure includes: a navigation information obtaining module, an image information combination module, a sensor data obtaining module, an endurance distance obtaining module, an alternative-landing area obtaining module, a landing area selection module, and a path generation module.

The navigation information obtaining module is configured to obtain a historical satellite image, meteorological information, and a contour image in a flight course.

The image information combination module is configured to obtain, based on the contour image and a satellite image in the flight course, a satellite image containing contour information.

The sensor data obtaining module is configured to obtain sensor data based on a sensor disposed on an aircraft.

The endurance distance obtaining module is configured to calculate an endurance distance of the aircraft based on the sensor data and the meteorological information.

The alternative-landing area obtaining module is configured to obtain an alternative landing area by the satellite image containing the contour information and a terrain image recognition model based on the coordinates and the endurance distance of the aircraft.

The landing area selection module is configured to obtain a current satellite image of the alternative landing area and determine a landing area.

The path generation module is configured to select a landing site by a landing site decision model based on the landing area and generate a path for a forced landing, such that the aircraft completes a forced landing task according to the path for the forced landing.

Figure 2:
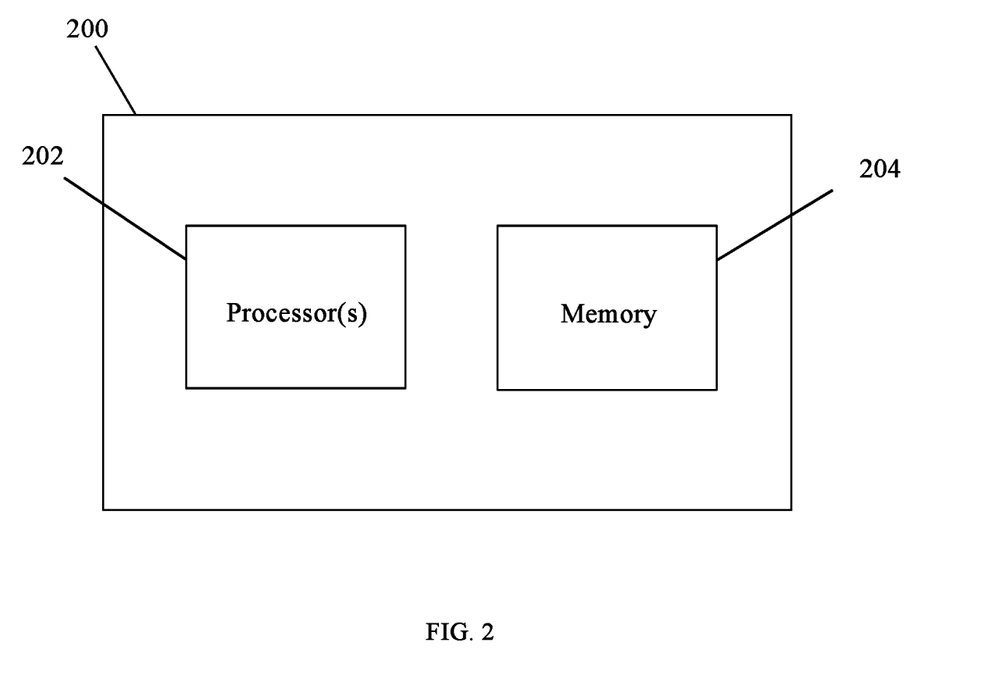
FIG. 2 is a diagram of a device in accordance with an embodiment of the present application.

As illustrated in FIG. 2, an electronic device 200 according to a fourth embodiment of the present disclosure includes: at least one processor 202 and a memory 204 communicatively connected to the at least one processor. The memory stores an instruction executable by the processor, and the instruction is configured to be executed by the processor to implement the above method for planning a path for a forced landing of an aircraft based on image recognition.

A computer-readable storage medium according to a fifth embodiment of the present disclosure stores a computer instruction, and the computer instruction is configured to be executed by a computer to implement the above method for planning a path for a forced landing of an aircraft based on image recognition.

Those skilled in the art should clearly understand that, for convenience and brevity of description, reference may be made to corresponding processes in the above method embodiments for specific working processes and related description of the storage apparatus and processing apparatus, and details are not described herein again.

Particularly, according to the embodiments of the present disclosure, the process described above with reference to the flowchart may be implemented as a computer software program. For example, an embodiment of the present disclosure includes a computer program product including a computer program carried by a computer-readable medium. The computer program includes program code for executing the method shown in the flowchart. In this embodiment, the computer program may be downloaded from a network by means of the communication part and installed and/or be installed from the removable medium. When the computer program is executed by the CPU, the functions defined in the method of the present disclosure are executed. It should be noted that, the computer-readable medium in the present disclosure may be a computer-readable signal medium, a computer-readable storage medium, or a combination thereof. The computer-readable storage medium may be, for example, but not limited to, electrical, magnetic, optical, electromagnetic, infrared, or semiconductor systems, apparatuses, or devices, or any combination thereof. More specific examples of the computer-readable storage medium may include but are not limited to: an electric connector with one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any proper combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal propagated in a baseband or propagated as a part of a carrier and carries computer-readable program code. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate, or transmit a program used by or used in combination with an instruction execution system, apparatus, or device. The program code contained on the computer-readable medium may be transmitted using any suitable medium, including but not limited to: wireless, wire, optical fiber, RF, or any suitable combination thereof.

The computer program code for executing the operations in the present disclosure may be compiled by one or more program design languages or a combination thereof. The programming languages may include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN), or may be connected to an external computer (for example, connected via the Internet by using an Internet service provider).

The flowcharts and block diagrams in the accompanying drawings illustrate system architectures, functions, and operations that may be implemented by the system, method, and computer program product according to the embodiments of the present disclosure. In this regard, each block in the flowcharts or block diagrams may represent a module, a program segment or a part of code. The module, the program segment, or the part of code may include one or more executable instructions for implementing specified logic functions. It should also be noted that, in some alternative implementations, the functions marked in the blocks may alternatively be performed in an order different from that marked in the drawings. For example, two successively shown blocks actually may be executed in parallel substantially or may be executed in reverse order sometimes, depending on the functions involved. It should also be noted that each block in the block diagrams and/or flowcharts and combinations of the blocks in the block diagrams and/or flowcharts may be implemented by a dedicated hardware-based system for executing specified functions or operations or may be implemented by a combination of dedicated hardware and computer instructions.

Terms such as "first" and "second" are intended to distinguish between similar objects, rather than describe or indicate a specific order or sequence.

Terms "include", "comprise" or any other variations thereof are intended to cover non-exclusive inclusions, such that a process, a method, an article, or a device/apparatus including a series of elements not only includes those elements, but also includes other elements that are not explicitly listed, or also includes inherent elements of the process, the method, the article, or the device/apparatus.

The technical solutions of the present disclosure are described with reference to the preferred implementations shown in the accompanying drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A method for planning a path for a forced landing of an aircraft based on an image recognition, comprising:
    obtaining a historical satellite image in a flight course, meteorological information in the flight course, and a contour image in the flight course;
    obtaining, based on the contour image and the historical satellite image in the flight course, a satellite image containing contour information;
    obtaining sensor data based on a sensor disposed on the aircraft;
    calculating an endurance distance of the aircraft based on the sensor data and the meteorological information;
    determining an alternative landing area by the satellite image containing the contour information and a terrain image recognition model based on coordinates of the aircraft and the endurance distance of the aircraft, wherein the determining the alternative landing area comprises
        selecting continuous areas with a height difference less than a preset smoothness threshold as flat areas based on the satellite image containing the contour information,
        recognizing a terrain analysis result of each flat area by at least one hardware processor implementing the terrain image recognition model,
        calculating a length of a touchdown taxiing rectangular box and a width of the touchdown taxiing rectangular box based on the terrain analysis result, and
        selecting a flat area sufficient to contain the touchdown taxiing rectangular box from the flat areas, wherein the selected flat area is regarded as the alternative landing area, and calculating a landing score for the alternative landing area based on the terrain analysis result;
    obtaining a current satellite image of the alternative landing area and determining a landing area; and
    selecting a landing site by a landing site decision model based on the landing area and generating the path for the forced landing, and the aircraft completes a forced landing task according to the path for the forced landing,
    wherein the method is performed by the at least one hardware processor.

2. The method according to claim 1, wherein the terrain image recognition model comprises a terrain type recognition model, a terrain uniformity recognition model, and a block consistency recognition model, and the method further comprises
    recognizing, by the processor implementing the terrain type recognition model, a terrain type of the flat area based on the historical satellite image;
    recognizing, by the processor implementing the terrain uniformity recognition model, an image uniformity score of the flat area based on the historical satellite image;
    dividing, by the processor implementing the block consistency recognition model, the historical satellite image into different grids and calculating, by the processor implementing the block consistency recognition model, a consistency score between each grid of the different grids and other grids of the different grids; and
    obtaining the terrain analysis result through a weighted summation based on the terrain type, the image uniformity score, and the consistency score.

3. The method according to claim 2, wherein the terrain type recognition model is a classification model, wherein the classification model is constructed based on a local binary pattern (LBP) algorithm and a K-clustering algorithm and the method further comprises the following steps, performed by the processor to implement the terrain type recognition model:
    converting a historical satellite image of the flat area into a binary image and setting a neighborhood window for each pixel dot;
    calculating an average pixel value of pixels in the neighborhood window of each pixel dot;
    comparing the average pixel value with a pixel value of a corresponding pixel dot, and marking a pixel dot with a pixel value being less than or equal to the average pixel value as 1 and a pixel dot with a pixel value being greater than the average pixel value as 0 to obtain an LBP image;
    performing a feature extraction on the LBP image by a convolution layer to obtain an LBP feature image;
    combining the LBP feature image and the historical satellite image of the flat area by a concat layer to obtain a combined feature image; and
    calculating a similarity between the combined feature image and each terrain image in a preset terrain category database by a K-nearest neighbor algorithm (KNN) classifier based on the combined feature image to output the terrain type of the flat area.

4. The method according to claim 3, wherein the method further comprises the following steps, performed by the processor to implement the terrain uniformity recognition model:
    calculating uniformity $\gamma$ between each pixel dot and a pixel in the flat area:

$$\gamma = \frac{\sum_{i=1, j=1}^{n} (e_{i,j} - \mu_x)(e_{i,j} - \mu_y)}{\sigma_x \sigma_y}$$

wherein $e_{i,j}$ represents a pixel value with coordinates being (i,j), i and j represent pixel numbers, $\mu_x$ represents an expected pixel value in an x-axis direction, $\mu_y$ represents an expected pixel value in a y-axis direction, $\sigma_x$ represents a standard deviation between pixels in the x-axis direction, and $\sigma_y$ represents a standard deviation between pixels in the y-axis direction; and
    an average correlation degree of pixel dots in the flat area represents the image uniformity score of the flat area.

5. The method according to claim 4, wherein the block consistency recognition model is as follows:

$$U = \sum_{l} \lambda_c U_c^l + \lambda_d U_d^l$$

wherein U represents the consistency score, l represents a scale of grids, $U_c^l$ represents a color consistency score, $U_d^l$ represents a consistency score of a relative height, $\lambda_c$ represents a weight of the color consistency score, and $\lambda_d$ represents a weight of the consistency score of the relative height;
    the color consistency score $U_c^l$ is calculated by the following formula:

$$U_c^l = U_{color, p \to q} + U_{color, q \to p}$$

wherein $U_{color,p \to q}$ represents a color similarity from a grid p to a grid q, and $U_{color,q \to p}$ represents a color similarity from the grid q to the grid p, wherein, $$U_{color,p \to q} = \frac{1}{N} \sum_{s_p s_q} \alpha \frac{1 - SSIM(s_p, s_q)}{2} + (1 - \alpha)|s_p - s_q|$$

$$U_{color,q \to p} = \frac{1}{N} \sum_{s_q s_p} \alpha \frac{1 - SSIM(s_q, s_p)}{2} + (1 - \alpha)|s_q - s_p|$$

wherein $SSIM(s_p, s_q)$ and $SSIM(s_q, s_p)$ represent a calculation of a similarity from a grid p to a grid q and a calculation of a similarity from the grid q to the grid p, respectively, $s_p$ and $s_q$ represent an average color value of the grid p and an average color value of the grid q, respectively; and α represents a preset constant, and N represents a quantity of the grid p and the grid q; and the consistency score $U^l_d$ of the relative height is calculated by the following formula:

$$U^l_d = U_{depth,p \to q} + U_{depth,p \to q}$$

wherein $U_{depth,p \to q}$ represents a consistency of relative heights of images from the grid p to the grid q, and $U_{depth,q \to p}$ represents a consistency of relative heights of the images from grid q to grid p, wherein:

$$U_{depth,p \to q} = \frac{1}{N} \sum |d_p - d_q|$$

$$U_{depth,q \to p} = \frac{1}{N} \sum |d_q - d_p|$$

wherein $d_p$ represents an average height of grid p, and $d_q$ represents an average height of grid q.

6. The method according to claim 1, wherein the step of obtaining the current satellite image of the alternative landing area and determining the landing area comprises:
   obtaining the current satellite image of the alternative landing area; and
   calculating a first similarity between a current satellite image of an alternative landing area with a highest landing score and the historical satellite image; and when the first similarity is greater than or equal to a preset reliable threshold, determining the alternative landing area with the highest landing score as the landing area; or
   when the first similarity is less than the preset reliable threshold, selecting an alternative landing area with a second highest landing score, calculating a second similarity between a current satellite image of the alternative landing area with the second highest landing score and the historical satellite image, and determining the landing area until a calculated similarity is greater than or equal to the preset reliable threshold.

7. The method according to claim 1 wherein the step of selecting the landing site comprises:
   calculating a travel direction from the coordinates of the aircraft to the landing area based on the coordinates of the aircraft; and
   in the landing area, taking the travel direction as an axis; and if there is a space containing the touchdown taxiing rectangular box in a direction of the axis, selecting a midpoint of a first start edge as the landing site, wherein the first start edge is configured to achieve a longest touchdown taxiing rectangular box in the direction of the axis; or
   if there is no the space containing the touchdown taxiing rectangular box in the direction of the axis, selecting a midpoint of a second start edge as the landing site, wherein the second start edge is configured to achieve the longest touchdown taxiing rectangular box in a direction with a smallest deflection angle in the direction of the axis.

8. The method according to claim 2, wherein the method further comprises a step of evaluating a rescue difficulty, the step of evaluating the rescue difficulty comprises:
   for historical satellite images of alternative landing areas, calculating routes from the alternative landing areas to a main road and route distances, wherein
   the routes each meet that in the satellite image containing the contour information, a height difference within a preset horizontal distance is less than a preset slope threshold;
   setting a rescue difficulty score based on the route distances; and
   obtaining the terrain analysis result by performing a weighted summation on the rescue difficulty score, the terrain type, the image uniformity score, and the consistency score.

9. A system for planning a path for a forced landing of an aircraft based on an image recognition, comprising:
   a non-transitory computer-readable storage medium comprising at least one program of instructions; and
   at least one hardware processor configured to execute the program of instructions to implement a navigation information obtaining module, an image information combination module, a sensor data obtaining module, an endurance distance obtaining module, an alternative-landing area obtaining module, a landing area selection module, and a path generation module, wherein
   the processor, in implementing the navigation information obtaining module, is configured to obtain a historical satellite image in a flight course, meteorological information in the flight course, and a contour image in the flight course;
   the processor, in implementing the image information combination module, is configured to obtain, based on the contour image and the historical satellite image in the flight course, a satellite image containing contour information;
   the processor, in implementing the sensor data obtaining module, is configured to obtain sensor data based on a sensor disposed on the aircraft;
   the processor, in implementing the endurance distance obtaining module, is configured to calculate an endurance distance of the aircraft based on the sensor data and the meteorological information;
   the processor, in implementing the alternative-landing area obtaining module, is configured to determine an alternative landing area by the satellite image containing the contour information and a terrain image recognition model based on coordinates of the aircraft and the endurance distance of the aircraft, wherein the processor, in implementing the alternative-landing area obtaining module, is further configured to select continuous areas with a height difference less than a preset smoothness threshold as flat areas based on the satellite image containing the contour information, recognize a terrain analysis result of each flat area by the processor implementing the terrain image recognition model, calculate a length of a touchdown taxiing rectangular box and a width of the touchdown taxiing rectangular box based on the terrain analysis result, and select a flat area sufficient to contain the touchdown taxiing rectangular box from the flat areas, wherein the selected flat area is regarded as the alternative landing area, and calculate a landing score for the alternative landing area based on the terrain analysis result;

the processor, in implementing the landing area selection module, is configured to obtain a current satellite image of the alternative landing area and the processor, in implementing the landing area selection module, is configured to determine a landing area; and the processor, in implementing the path generation module, is configured to select a landing site by a landing site decision model based on the landing area, and the processor, in implementing the path generation module, is configured to generate the path for the forced landing, and the aircraft completes a forced landing task according to the path for the forced landing.

10. An electronic device, comprising at least one hardware processor and a memory, wherein the memory is communicatively connected to the at least one hardware processor, wherein an instruction executable by the processor is stored in the memory, and the instruction is configured to be executed by the processor to:

obtain a historical satellite image in a flight course, meteorological information in the flight course, and a contour image in the flight course;

obtain, based on the contour image and the historical satellite image in the flight course, a satellite image containing contour information;

obtain sensor data based on a sensor disposed on the aircraft;

calculate an endurance distance of the aircraft based on the sensor data and the meteorological information;

determine an alternative landing area by the satellite image containing the contour information and a terrain image recognition model based on coordinates of the aircraft and the endurance distance of the aircraft by selecting continuous areas with a height difference less than a preset smoothness threshold as flat areas based on the satellite image containing the contour information, recognizing a terrain analysis result of each flat area by the processor implementing the terrain image recognition model, calculating a length of a touchdown taxiing rectangular box and a width of the touchdown taxiing rectangular box based on the terrain analysis result, and selecting a flat area sufficient to contain the touchdown taxiing rectangular box from the flat areas, wherein the selected flat area is regarded as the alternative landing area, and calculating a landing score for the alternative landing area based on the terrain analysis result;

obtain a current satellite image of the alternative landing area and determining a landing area; and select a landing site by a landing site decision model based on the landing area and generating the path for the forced landing, and the aircraft completes a forced landing task according to the path for the forced landing.

11. A non-transitory computer-readable storage medium, wherein a computer instruction is stored in the computer-readable storage medium, and the computer instruction is configured to be executed by the at least one hardware processor to implement the method according to claim 1.

12. The electronic device according to claim 10, wherein the terrain image recognition model comprises a terrain type recognition model, a terrain uniformity recognition model, and a block consistency recognition model, and wherein in implementing the terrain type recognition model, the processor is configured to recognize a terrain type of the flat area based on the historical satellite image;

in implementing the terrain uniformity recognition model, the processor is configured to recognize an image uniformity score of the flat area based on the historical satellite image;

in implementing the block consistency recognition model, the processor is configured to divide the historical satellite image into different grids and the block consistency recognition model is configured to calculate a consistency score between each grid of the different grids and other grids of the different grids; and the processor obtains the terrain analysis result through a weighted summation based on the terrain type, the image uniformity score, and the consistency score.

13. The electronic device according to claim 12, wherein the terrain type recognition model is a classification model, wherein the classification model is constructed based on a local binary pattern (LBP) algorithm and a K-clustering algorithm and the processor, in implementing the terrain type recognition model, is configured to:

convert a historical satellite image of the flat area into a binary image and set a neighborhood window for each pixel dot;

calculate an average pixel value of pixels in the neighborhood window of each pixel dot;

compare the average pixel value with a pixel value of a corresponding pixel dot, and mark a pixel dot with a pixel value being less than or equal to the average pixel value as 1 and a pixel dot with a pixel value being greater than the average pixel value as 0 to obtain an LBP image;

perform a feature extraction on the LBP image by a convolution layer to obtain an LBP feature image;

combine the LBP feature image and the historical satellite image of the flat area by a concat layer to obtain a combined feature image; and calculate a similarity between the combined feature image and each terrain image in a preset terrain category database by a K-nearest neighbor algorithm (KNN) classifier based on the combined feature image to output the terrain type of the flat area.

14. The electronic device according to claim 13, wherein, the processor, in implementing the terrain uniformity recognition model, is configured to calculate uniformity $\gamma$ between each pixel dot and a pixel in the flat area:

$$\gamma = \frac{\sum_{i=1, j=1}^{n} (e_{i,j} - \mu_x)(e_{i,j} - \mu_y)}{\sigma_x \sigma_y}$$

wherein $e_{i,j}$ represents a pixel value with coordinates being (i, j), i and j represent pixel numbers, $\mu_x$ represents an expected pixel value in an x-axis direction, $\mu_y$ represents an expected pixel value in a y-axis direction, $\sigma_x$ represents a standard deviation between pixels in the x-axis direction, and $\sigma_y$ represents a standard deviation between pixels in the y-axis direction; and an average correlation degree of pixel dots in the flat area represents the image uniformity score of the flat area.

15. The electronic device according to claim 14, wherein the block consistency recognition model is as follows:

$$U = \sum_l \lambda_c U_c^l + \lambda_d U_d^l$$

wherein U represents the consistency score, l represents a scale of grids, $U_c^l$ represents a color consistency score, $U_d^l$ represents a consistency score of a relative height, $\lambda_c$ represents a weight of the color consistency score, and $\lambda_d$ represents a weight of the consistency score of the relative height;

the color consistency score $U_c^l$ is calculated by the following formula:

$$U_c^l = U_{color,p \to q} + U_{color,q \to p}$$

wherein $U_{color,p \to q}$ represents a color similarity from a grid p to a grid q, and $U_{color,q \to p}$ represents a color similarity from the grid q to the grid p, wherein, $$U_{color,p \to q} = \frac{1}{N} \sum_{s_p s_q} \alpha \frac{1 - SSIM(s_p, s_q)}{2} + (1-\alpha)|s_p - s_q|$$

$$U_{color,q \to p} = \frac{1}{N} \sum_{s_q s_p} \alpha \frac{1 - SSIM(s_q, s_p)}{2} + (1-\alpha)|s_q - s_p|$$

wherein $SSIM(s_p, s_q)$ and $SSIM(s_q, s_p)$ represent a calculation of a similarity from a grid p to a grid q and a calculation of a similarity from the grid q to the grid p, respectively, $s_p$ and $s_q$ represent an average color value of the grid p and an average color value of the grid q, respectively; and $\alpha$ represents a preset constant, and N represents a quantity of the grid p and the grid q; and the consistency score $U_d^l$ of the relative height is calculated by the processor using the following formula:

$$U_d^l = U_{depth,p \to q} + U_{depth,q \to p}$$

wherein $U_{depth,p \to q}$ represents a consistency of relative heights of images from the grid p to the grid q, and $U_{depth,p \to q}$ represents a consistency of relative heights of the images from grid q to grid p, wherein:

$$U_{depth,p \to q} = \frac{1}{N} \sum |d_p - d_q|$$

$$U_{depth,q \to p} = \frac{1}{N} \sum |d_q - d_p|$$

wherein $d_p$ represents an average height of grid p, and $d_q$ represents an average height of grid q.

16. The electronic device according to claim 10, wherein the processor is configured to obtain the current satellite image of the alternative landing area and determine the landing area by:

obtaining the current satellite image of the alternative landing area; and calculating a first similarity between a current satellite image of an alternative landing area with a highest landing score and the historical satellite image; and when the first similarity is greater than or equal to a preset reliable threshold, determining the alternative landing area with the highest landing score as the landing area; or when the first similarity is less than the preset reliable threshold, selecting an alternative landing area with a second highest landing score, calculating a second similarity between a current satellite image of the alternative landing area with the second highest landing score and the historical satellite image, and determining the landing area until a calculated similarity is greater than or equal to the preset reliable threshold.

17. The electronic device according to claim 10, wherein the processor is configured to select the landing site by:

calculating a travel direction from the coordinates of the aircraft to the landing area based on the coordinates of the aircraft; and in the landing area, taking the travel direction as an axis; and if there is a space containing the touchdown taxiing rectangular box in a direction of the axis, selecting a midpoint of a first start edge as the landing site, wherein the first start edge is configured to achieve a longest touchdown taxiing rectangular box in the direction of the axis; or if there is no the space containing the touchdown taxiing rectangular box in the direction of the axis, selecting a midpoint of a second start edge as the landing site, wherein the second start edge is configured to achieve the longest touchdown taxiing rectangular box in a direction with a smallest deflection angle in the direction of the axis.

18. The electronic device according to claim 12, wherein the processor is further configured to evaluate a rescue difficulty by:

calculating, for historical satellite images of alternative landing areas, routes from the alternative landing areas to a main road and route distances, wherein for the routes that meet in the satellite image containing the contour information, a height difference within a preset horizontal distance is less than a preset slope threshold;

setting a rescue difficulty score based on the route distances; and obtaining the terrain analysis result by performing a weighted summation on the rescue difficulty score, the terrain type, the image uniformity score, and the consistency score.

* * * * *